(12) United States Patent
Adler et al.

(10) Patent No.: US 8,526,815 B2
(45) Date of Patent: Sep. 3, 2013

(54) DYNAMIC BANDWIDTH ALLOCATION FOR CONGESTION MANAGEMENT IN PON CHANNEL AGGREGATION

(75) Inventors: Gal Adler, Tel Aviv (IL); Israel Ben Shahar, Mevaseret Zion (IL)

(73) Assignee: PMC-Sierra Israel Ltd., Herzliya Pituach (IL)

( * ) Notice: Subject to any disclaimer, the term of this patent is extended or adjusted under 35 U.S.C. 154(b) by 152 days.

(21) Appl. No.: 13/110,956

(22) Filed: May 19, 2011

(65) Prior Publication Data

US 2012/0294611 A1 Nov. 22, 2012

(51) Int. Cl.
*H04B 10/20* (2011.01)
*H04J 14/00* (2006.01)

(52) U.S. Cl.
USPC ............................... 398/58; 398/45; 370/235

(58) Field of Classification Search
USPC ................. 398/43–103; 370/395.1, 235, 420
See application file for complete search history.

(56) References Cited

U.S. PATENT DOCUMENTS

| | | | | |
|---|---|---|---|---|
| 6,728,248 | B1* | 4/2004 | Uchida et al. | 370/395.1 |
| 7,564,852 | B2* | 7/2009 | Das et al. | 370/395.41 |
| 7,990,853 | B2* | 8/2011 | Brolin | 370/229 |
| 2006/0013139 | A1* | 1/2006 | Koch et al. | 370/236 |
| 2006/0013260 | A1* | 1/2006 | Oron | 370/498 |
| 2006/0018322 | A1* | 1/2006 | Oron | 370/395.1 |
| 2007/0064731 | A1* | 3/2007 | Mizutani et al. | 370/468 |
| 2008/0239981 | A1* | 10/2008 | Kanda et al. | 370/252 |
| 2009/0142059 | A1* | 6/2009 | Chen et al. | 398/58 |
| 2009/0202242 | A1* | 8/2009 | Niibe et al. | 398/63 |
| 2009/0328119 | A1* | 12/2009 | Kan et al. | 725/107 |
| 2010/0021161 | A1* | 1/2010 | Endo et al. | 398/45 |
| 2011/0142442 | A1* | 6/2011 | Hirth et al. | 398/25 |
| 2011/0299413 | A1* | 12/2011 | Chatwani et al. | 370/252 |
| 2011/0305451 | A1* | 12/2011 | Nishitani et al. | 398/25 |
| 2012/0093500 | A1* | 4/2012 | Shiba et al. | 398/25 |
| 2012/0093508 | A1* | 4/2012 | Baykal et al. | 398/58 |

OTHER PUBLICATIONS

IEEE Standard Information technology—Telecommunications and information exchange between systems—Local and metropolitan area networks—Specific requirements, Part 3 "Carrier Sense Multiple Access with Collision Detection (CSMA/CD)Access Method and Physical Layer Specifications" Amendment: Media Access Control Parameters, Physical Layers, and Management Parameters for Subscriber Access Networks. IEEE Computer Society, IEEE Std 802.3ah-2004, Sep., pp. 1-623.

(Continued)

*Primary Examiner* — Ken Vanderpuye
*Assistant Examiner* — Dibson Sanchez
(74) *Attorney, Agent, or Firm* — Mark M. Friedman

(57) ABSTRACT

A method and protocol for dynamic upstream bandwidth allocation to prevent congestion in an aggregation system consisting of multiple PON OLT devices that share a common Service Network Interface (SNI). The method allows OLT devices to communicate real time user traffic load information, and for each OLT to self-throttle upstream throughput based on overall system view of traffic load. The method allows the available SNI bandwidth to be dynamically allocated to OLT ports while maintaining fairness per ONT (user). The method is implemented as a peer-to-peer protocol and does not require central controller resources. The method can be implemented in existing PON systems using software. The method saves the need for expensive dedicated traffic manager devices on the OLT aggregation point.

22 Claims, 5 Drawing Sheets

(56) References Cited

OTHER PUBLICATIONS

ITU-T G., Telecommunication Standardization Sector of ITU, G.984.3, Series G: Transmission Systems and Media, Digital Systems and Networks, Digital sections and digital fine system—Optical line, systems for local and access networks, Gigabit-capable Passive Optical Networks (G-PON): Transmission convergence layer specification, (Mar. 2008), pp. 1-135.

* cited by examiner

| OLT #1 example bandwidth allocation calculation | | |
|---|---|---|
| Total available Level-0 | 200KB | |
| Level-0 total system report | (3+8)*10=110KB | Level-0 system grant | 110KB (100%) |
| Level-0 local report | 3*10=30KB | Level-0 local grant | 30KB (100%) |
| Total available Level-1 | 200-110=90KB | | |
| Level-1 total system report | (3+3)*(20-10)=60KB | Level-1 system grant | 60KB (100%) |
| Level-1 local report | 3*(20-10)=30KB | Level-1 local grant | 30KB (100%) |
| Total available Level-2 | 90-60=30KB | | |
| Level-2 total system report | (1+3)*(100-20)=320KB | Level-2 system grant | 30KB (9.375%) |
| Level-2 local report | 1*(100-20)=80KB | Level-2 local grant | 7.5KB (80KBx9.375%) |
| Total available Level-3 | 30-30=0KB | | |
| Level-3 total system report | (1+1)*(200-100)=200KB | Level-3 system grant | 0KB |
| Level-3 local report | 1*(200-100)=100KB | Level-3 local grant | 0KB |
| | | All levels aggregated System grant | 110+60+30= 200KB |
| | | Aggregated Local grant for OLT#1 | 30+30+7.5= 67.5KB |

FIGURE 4

DYNAMIC BANDWIDTH ALLOCATION FOR CONGESTION MANAGEMENT IN PON CHANNEL AGGREGATION

FIELD OF THE INVENTION

The present embodiment generally relates to the field of communications, and in particular, it concerns a system and method for congestion management in PON channels aggregation, using dynamic bandwidth allocation.

BACKGROUND OF THE INVENTION

Passive optical networks (PONs) are a popular choice for modern communications systems. Both users and providers constantly demand increased performance for networks. Referring to FIG. 1, a diagram of a typical PON system, each of several optical line terminals (OLTs) 100 communicates with one or more optical network terminals (ONTs) 104. ONTs are also known as optical network units (ONUs). An OLT transmits over a downstream channel received by all ONUs, and assigns transmission slots on the upstream channel to specific ONUs. The bandwidth assignment may be static or dynamic based on real time traffic load at the specific ONUs and the ONUs' indicated needs for transmission bandwidth. A typical system consists of multiple OLT port controllers such as 105 in an OLT controller, such as OLT controller 102. Each OLT port controller, such as one of OLT port controllers 105, implements a respective OLT PON port, such as one of OLT PON ports 107, each PON port having an associated PON 108. Each OLT PON port is connected through a PON to multiple ONTs, such as ONTs 106. Each ONT provides services to one or more subscribers (end users). OLT PON ports are also referred to as PON ports, or PON channels. In the context of this document, the term PON system generally refers to all of the OLTs and related components associated with a given SNI.

Additional background information on PONs and related technology relevant to the current document can be found in the following specifications:
- ITU-T Recommendation G.983—is a family of recommendations that defines broadband passive optical network (BPON) telecommunications access networks
- ITU-T Recommendation G.984—is a family of recommendations that defines gigabit passive optical network (GPON) telecommunications access networks
- ITU-T Recommendation G.987—is a family of recommendations that defines 10 gigabit passive optical network (XG-PON) telecommunications access networks
- IEEE standard 802.3ah—Ethernet PON (EPON).

PON systems typically require connectivity to a regional broadband network 120, also referred to as a metro network. A typical configuration is to connect multiple PONs 108 via associated OLT port controllers 105 and OLT controllers 102 to a regional broadband network through a common service network interface (SNI) 122. The SNI provides an uplink channel from the PON system to the regional broadband network 120. The location at which traffic is aggregated from OLT port controllers toward the SNI is known as an aggregation point 124. In the context of this document, traffic is also referred to as data. An aggregation device, such as an Ethernet switch 126, is typically used to aggregate traffic from the PON ports towards the SNI 122. Note that for clarity in FIG. 1 the direction of arrows show only the direction of traffic aggregation. One skilled in the art will realize that traffic flows are bi-directional, and that other connections between components in the PON system may exist for command, control, communications, and other system functions.

In most systems, the bandwidth capacity of the SNI uplink channel is much smaller (typically 2-10 times smaller) than the aggregated upstream bandwidth capacity of all the OLT PON channels. This condition is known also as "oversubscription", and may result in network traffic congestion at the aggregation point. Network traffic congestion is highly undesirable, as congestion may result in increased traffic latency, loss of Quality-of-Service (QoS), and/or under-utilization of network resources.

Conventional PON systems may employ one of the following solutions in order to avoid congestion in the SNI uplink aggregation channel:
1. Priority based queuing in the aggregation switch. This technique protects high priority traffic and allows high priority traffic to flow even during congestion, however this technique will not resolve the congestion problem for equal priority traffic.
2. Limiting the rate of traffic of each PON channel. The aggregated traffic rate of all PON channels does not exceed the SNI bandwidth. This solution eliminates the congestion, but does not allow for dynamic allocation of bandwidth based on real time traffic demand conditions. As a result, the SNI bandwidth resources are not effectively utilized.
3. Using a dedicated traffic manager device. A traffic manager device, also referred to in the industry as simply a traffic manager, is a device that buffers ingress (upstream from ONTs) traffic, classifies the traffic into queues, and regulates the egress traffic (from the OLT port controllers towards the SNI) according to a configured service policy. Such a device solves the congestion problem, but traffic manager devices are very expensive compared to other system costs, and require additional resources (power, memory) in the system.

There is therefore a need for congestion management solution in PON channels aggregation without using a dedicated traffic manager device and without static limiting of the traffic rate in each OLT.

SUMMARY

According to the teachings of the present embodiment there is provided a method of dynamic bandwidth allocation in a passive optical network (PON) communications system, the PON communications system including a plurality of optical line terminal (OLT) port controllers, wherein each OLT port controller controls at least one respective optical networking terminal (ONT), and wherein data is forwarded by the OLT port controllers towards a service network interface (SNI), the method including the steps of: generating by each of the plurality of OLT port controllers a respective broadcast occupancy report (BOR); transmitting from each of the plurality of OLT port controllers the respective BORs to the plurality of OLT port controllers; receiving the respective BORs at each of the plurality of OLT port controllers; and dynamically assigning bandwidth at each of the plurality of OLT port controllers to each of the controlled ONTs based on the respective BORs that the OLT port controllers receive.

In an optional embodiment, the BOR includes pre-defined levels of occupancy, each of the pre-defined levels of occupancy indicative of an amount of data waiting to be sent from an ONT, each of the pre-defined levels of occupancy reporting a total number of ONTs that are controlled by the OLT port controller that generates the BOR and that have at least the amount of data waiting to be sent. In another optional embodiment, each of the pre-defined levels of occupancy except for a topmost pre-defined level of occupancy reports a total number of controlled ONTs having occupancy above the each pre-defined level of occupancy and at most equal to a next pre-defined level of occupancy.

In another optional embodiment, the BORs are generated periodically and at substantially the same time. In another optional embodiment, the BORs are received periodically and at substantially the same time. In another optional embodiment, the BORs are generated at a rate sufficient to facilitate real-time dynamic bandwidth allocation between the plurality of OLT port controllers.

In another optional embodiment, the BORs are transmitted via Ethernet using a method selected from the group consisting of: broadcast, multicast, and unicast communications. In another optional embodiment, the BORs are transmitted from every OLT port controller to every other OLT port controller via an Ethernet switch using broadcast Ethernet frames.

In another optional embodiment, a plurality of BORs are generated, each of the plurality of BORs corresponding to a priority level of the data, and dynamically assigning bandwidth based on the plurality of BORs.

According to the teachings of the present embodiment there is provided a system for dynamic bandwidth allocation in a passive optical network (PON) communications system wherein data is forwarded towards a service network interface (SNI), the system including: a plurality of optical networking terminals (ONTs); and a plurality of optical line terminal (OLT) port controllers, each OLT port controller configured for: controlling at least one respective ONT of the plurality of ONTs; generating a respective broadcast occupancy report (BOR); transmitting the respective BOR to the plurality of OLT port controllers; receiving the respective BORs; and dynamically assigning bandwidth to each of the controlled ONTs based on the received respective BORs.

In an optional embodiment, the BOR includes pre-defined levels of occupancy, each of the pre-defined levels of occupancy indicative of an amount of data waiting to be sent from an ONT, each of the pre-defined levels of occupancy reporting a total number of ONTs that are controlled by the OLT port controller that generates the BOR and that have at least the amount of data waiting to be sent. In another optional embodiment, each of the pre-defined levels of occupancy except for a topmost pre-defined level of occupancy reports a total number of controlled ONTs having occupancy above the each pre-defined level of occupancy and at most equal to a next pre-defined level of occupancy.

In another optional embodiment, each OLT port controller is configured to generate the BORs periodically and at substantially the same time. In another optional embodiment, each OLT port controller receives the BORs periodically and at substantially the same time. In another optional embodiment, each OLT port controller is configured to generate the BORs at a rate sufficient to facilitate real-time dynamic bandwidth allocation between the plurality of OLT port controllers.

In another optional embodiment, the broadcast occupancy reports are transmitted via Ethernet using a method selected from the group consisting of broadcast, multicast, and unicast communications. In another optional embodiment, the broadcast occupancy reports are transmitted from every the OLT port controller to every other the OLT port controller via an Ethernet switch using broadcast Ethernet frames.

In another optional embodiment, a plurality of BORs are generated, each of the plurality of BORs corresponding to a priority level of the data, and dynamically assigning bandwidth based on the plurality of BORs.

According to the teachings of the present embodiment there is provided a method of dynamic bandwidth allocation in a passive optical network (PON) communications system, the PON communications system including a plurality of optical line terminal (OLT) port controllers, wherein each OLT port controller controls at least one respective optical networking terminal (ONT), wherein data is forwarded by the OLT port controllers towards a service network interface (SNI), and, including a central controller, the method including the steps of: generating by each of the plurality of OLT port controllers a respective broadcast occupancy report (BOR); transmitting from each of the plurality of OLT port controllers the respective BORs to the central controller; receiving the respective BORs at the central controller, calculating, at the central controller a respective share of SNI bandwidth for each OLT port controller based on the received respective BORs, and transmitting the respective share of SNI bandwidth to each respective OLT port controller; receiving the respective share of SNI bandwidth at each of the plurality of OLT port controllers; and dynamically assigning bandwidth at each of the plurality of OLT port controllers to each of the controlled ONTs based on the received respective share of SNI bandwidth.

According to the teachings of the present embodiment there is provided a system for dynamic bandwidth allocation in a passive optical network (PON) communications system, the system including: a plurality of optical line terminal (OLT) port controllers, wherein each OLT port controller is configured for: controlling at least one respective optical networking terminal (ONT), wherein data is forwarded by the OLT port controllers towards a service network interface (SNI); generating a respective broadcast occupancy report (BOR); and transmitting the respective BORs; and a central controller, configured for: receiving the respective BORs; calculating a respective share of SNI bandwidth for each OLT port controller based on the received respective BORs; and transmitting the respective share of SNI bandwidth to each respective OLT port controller; and wherein each OLT port controller receives said respective share of SNI bandwidth and dynamically assigns bandwidth to each of the controlled ONTs based on the received respective share of SNI bandwidth.

BRIEF DESCRIPTION OF FIGURES

The embodiment is herein described, by way of example only, with reference to the accompanying drawings, wherein:

FIG. 4 is a table showing the calculation for a non-limiting example of a bandwidth allocation process.

DETAILED DESCRIPTION

Figure 1:
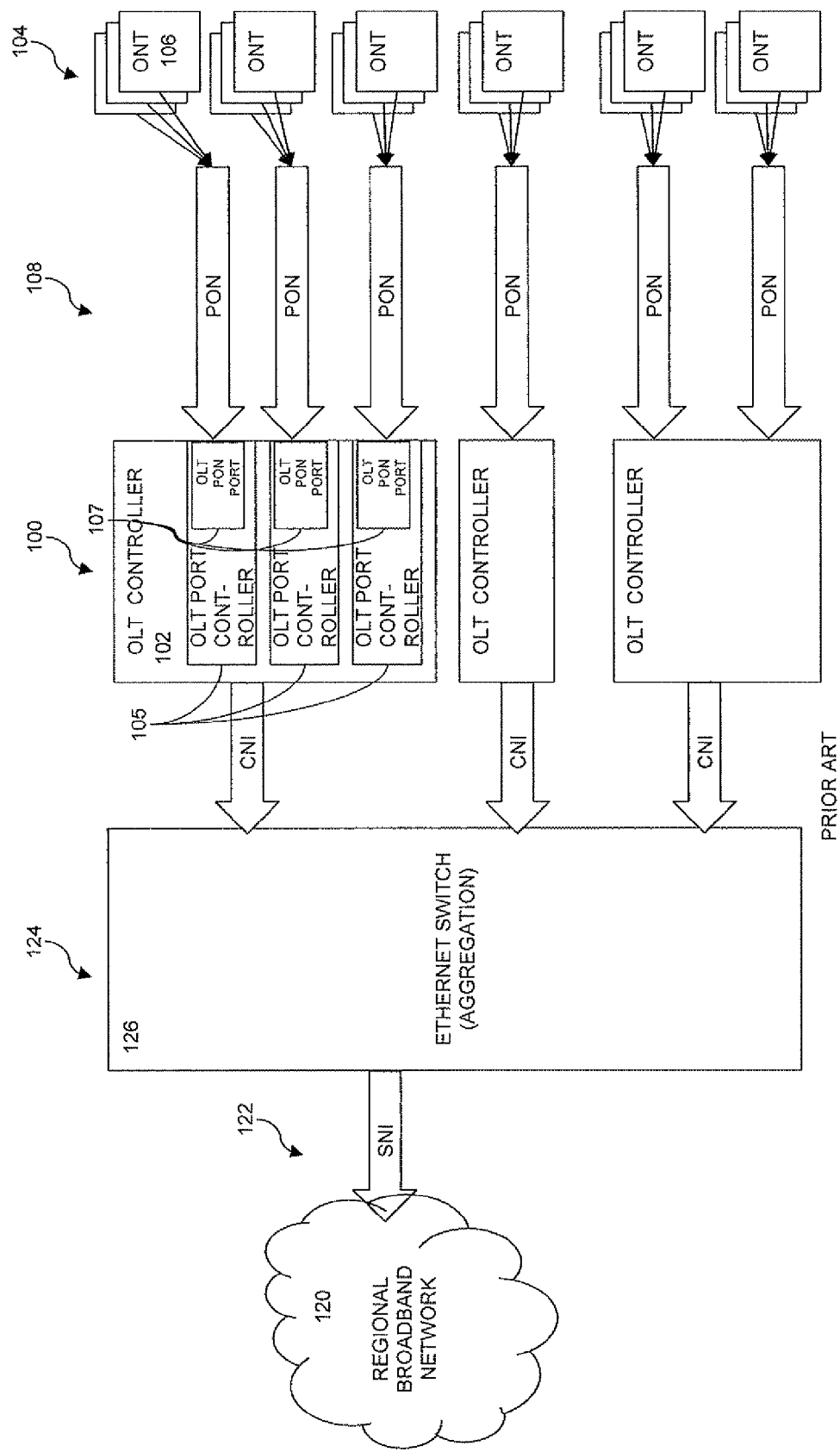
FIG. 1 is a diagram of a typical PON system.

The principles and operation of the system and method according to a present embodiment may be better understood with reference to the drawings and the accompanying description. A present embodiment is a system and method for congestion management and dynamic bandwidth allocation in PON channels aggregation. The system facilitates congestion management in PON channels aggregation without using a dedicated traffic manager device and without static limiting of the traffic rate in each PON, providing dynamic allocation of bandwidth to PON channels based on real-time traffic demand. The present embodiment can be implemented on existing PON systems, without hardware modifications, providing a cost effective alternative to conventional solutions.

According to the present embodiment, a passive optical network (PON) communications system includes a plurality of optical line terminal (OLT) port controllers, wherein each. OLT port controller controls at least one associated optical networking terminal (ONT). Data, also known as traffic, from the ONTs is aggregated via associated OLT port controllers and forwarded towards an aggregation device (typically an Ethernet switch), which aggregates traffic from the OLTs towards a service network interface (SNI). Each of the OLT port controllers generates a broadcast occupancy report (BOR) and sends the generated BOR to all of the other OLT port controllers in the PON system. Each participating OLT port controller receives BORs from all of the other OLT port controllers in the PON system and dynamically assigns bandwidth based on the received BORs for associated ONTs.

In the context of this document, allocating bandwidth includes dividing the available bandwidth of the SNI uplink channel among OLT port controllers so that ONTs associated with the OLT port controller are preferably provided with sufficient, but not more, bandwidth than each ONT and associated user and/or application requires at the time of bandwidth allocation.

The innovative use of broadcast occupancy reports (BORs), as will be explained in detail below, provides a scalable, peer-to-peer congestion management solution, without the need for a central traffic management device, which can cost-effectively be implemented on existing PON systems.

For clarity in this document, the description generally uses a PON communications network that includes a plurality of OLT port controllers, wherein each OLT port controller controls a PON having at least one ONT. A person ordinarily skilled in the art will realize that the current description is not limited to PON communications systems, and can be implemented for other systems with similar architectures, including but not limited to point to multi-point, broadband access, and aggregation systems. PONs and Ethernet PONs (EPONs) are non-limiting examples of point to multipoint topologies over fiber optic media, where an OLT is a headend node and secondary nodes are ONTs.

To gain an appreciation for the innovative method of the present embodiment, consider the growth of a PON system. A default case includes a single PON (one of 108), typically having a plurality of ONTs 106 with a corresponding single OLT port controller (one 105), Note that in a case where an OLT has a single OLT port controller, the combination and/or the OLT port controller is simply referred to as an OLT. The single OLT port controller 105 aggregates traffic from associated ONTs 106 towards a connected SNI 122. A standard feature of OLT port controllers includes the function of monitoring traffic load of associated ONTs and assigning (granting) transmission bandwidth to each ONT based on the available bandwidth of the OLT. The OLT assigns only enough bandwidth to each ONT to prevent congestion at the OLT.

Now consider a case where a PON system includes more than a single OLT port controller. Although each OLT port controller can manage the aggregated bandwidth of the associated PON (the associated ONTs), a mechanism is needed to manage the aggregated bandwidth at the next level—the aggregated traffic from all of the OLTs towards a common SNI. Conventional solutions and limitations have been previously described.

A preferable solution is to dynamically allocate the available bandwidth of the SNI uplink channel to the OLT port controllers, based on real time traffic demand, so that the aggregated traffic rate from the OLTs does not exceed the SNI bandwidth—thereby avoiding the congestion. Preferably, implementation should include existing PON systems, without hardware modifications, and provide a cost effective alternative to conventional solutions.

One possible solution is for each OLT to send a traffic report towards a central system controller, where the traffic report will need to include, for each ONT, a summary of how much data needs to be sent, the priority of each data, and possibly other traffic information. The central controller will then process the traffic reports and assign BW dynamically to each OLT based on a programmed BW allocation policy. In this way, BW will be dynamically assigned to the OLTs based on real time traffic demand. This approach however, may not be feasible in many PON systems due to the following:

The current approach assumes the availability of a central controller that has enough processing power to process traffic reports from all ONTs in the system. In most existing PON systems, the central controller is not powerful enough to handle this task.

In order to maintain fairness per subscriber, the central controller needs to receive a traffic report per each ONT. This solution may not be scalable to the large number of ONTs in typical PON systems, which can reach several hundreds.

The proposed solution of the present embodiment is for each OLT port controller to send a traffic report to all of the other OLT port controllers. In this way, no centralized controller is required to implement the protocol. This is essentially a peer-to-peer approach where all OLT controllers are peers and each OLT controller implements a respective bandwidth allocation policy. This peer-to-peer approach facilitates:

There is only unidirectional reporting—the decision is taken locally by the OLT controllers, which reduces decision latency.

Broadcast Ethernet frames can be used for sending the traffic reports. This means each traffic report has to be generated only once.

No need for a centralized processor (as mentioned above, a typical PON system has a central processor unit, but in most cases, the central processor unit does not have enough processing capacity to handle real time dynamic bandwidth allocation tasks). The BW allocation processing load is shared by the OLT controllers.

No need for a dedicated control link. As Ethernet frames are used for sending the traffic reports, the in-band channel (that is, the datapath used to transfer user traffic) may be used.

The traffic report would need to include, for each ONT, a summary of how much data needs to be sent, the priority of each data, and possibly other traffic information. The size of each traffic report depends on the size of the associated PON, and a larger number of ONTs results in a larger traffic report. Each OLT port controller would receive every traffic report and need to process the information about every ONT in the PON system, and then be able to make decisions regarding how much bandwidth can be allocated. This peer-to-peer traffic report solution increases as a function of the size of the network, which depending on the implementation, can be on the order of $O(N^2)$ (exponentially), (where N is the number of ONTs in the system) which quickly becomes an unscalable solution for typical modern networks.

In order to optimize this innovative method of sending a traffic report to all of the other OLT port controllers, make the method scalable and realistically applicable to current PON systems, a broadcast occupancy report (BOR) is now described which uses a static size, typically on the order of 10 bytes. This solution increases only on the order O(M) (linearly), (where M is the number of OLTs in the system) and scales well even for large PON systems. The innovative use of BORs facilitates using one report per OLT port controller, in contrast to the solution described above which requires using one report per ONT. While using only one BOR per OLT port controller, fairness is maintained at the ONT level.

Figure 2:
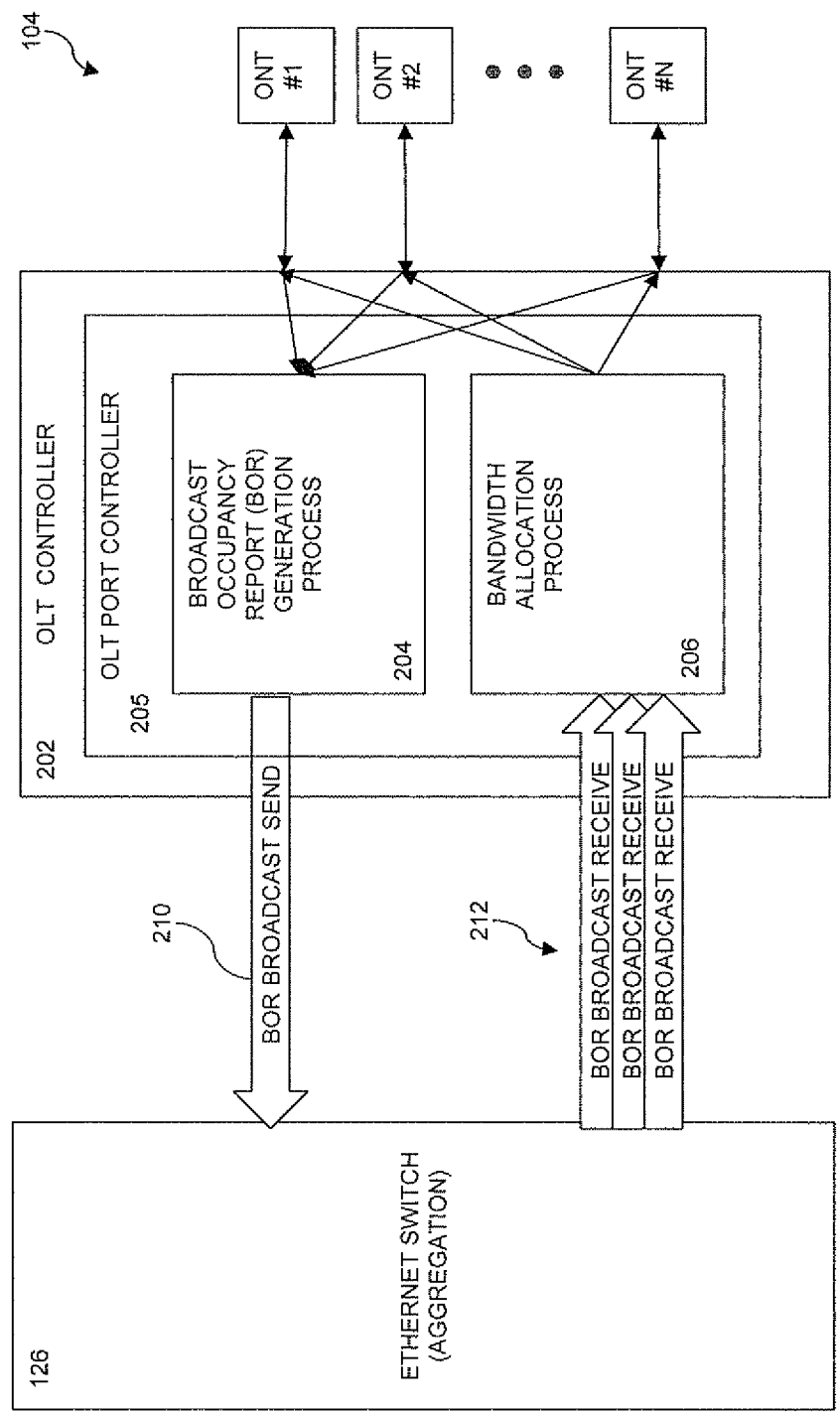
FIG. 2 is a diagram of broadcast occupancy report generation and allocation.

Referring now to the drawings, FIG. 2 is a diagram of broadcast occupancy report generation and allocation. Note, for clarity the current description will initially uses a case where all the managed traffic has equal priority, and then subsequently the description expands this case to include multiple priority levels. Periodic ONT occupancy reports are sent from ONTs 104 to an associated OLT port controller 205, such as one of OLT port controllers 105 from FIG. 1. OLT port 202 is also simply referred to as an OLT. Each ONT occupancy report reports the occupancy of the queues of the respective ONT to the associated OLT port controller, utilizing standard occupancy report mechanisms that exist in PON systems. Typically, ONT occupancy reports are received and processed by the OLT port controller using dedicated hardware or software or a combination of hardware and software implementation at the OLT port controller 205. An OLT broadcast occupancy report generation process 204 running on the OLT port controller 205 compiles the ONT occupancy reports into a periodic OLT occupancy report, referred to as a broadcast occupancy report (BOR). Note that reference is made to two occupancy reports: ONT occupancy reports and OLT occupancy reports. In the context of this document, unless otherwise specified, the term broadcast occupancy report (BOR) refers to an OLT occupancy report that is broadcast from an OLT port controller to other OLT port controllers sharing a common aggregation point. The occupancy reporting process (BOR generation process) is used by each OLT port controller to report to all other participating OLT port controllers occupancy levels at associated ONTs.

BORs are broadcast 210 from each OLT port controller to all other OLT port controllers on the PON system. A preferred configuration is to broadcast BORs via an Ethernet switch 126. BORs from other OLT port controllers are received 212 by participating OLT port controllers. An OLT bandwidth allocation process 206 running on each OLT port controller 205 compiles the received BORs. Based on the received BORs each OLT port controller 205 calculates a share of SNI bandwidth to be assigned to the respective OLT. Multicast as well as broadcast can be used. Broadcast is more efficient than multicast, and is a preferred implementation. In a case where there is a system limitation prohibiting the use of broadcast or multicast, unicast can also be used.

Instances of the two main processes, the broadcast occupancy report generation process 204 and the bandwidth allocation process 206, are implemented on each of the participating OLT port controllers.

Figure 3:
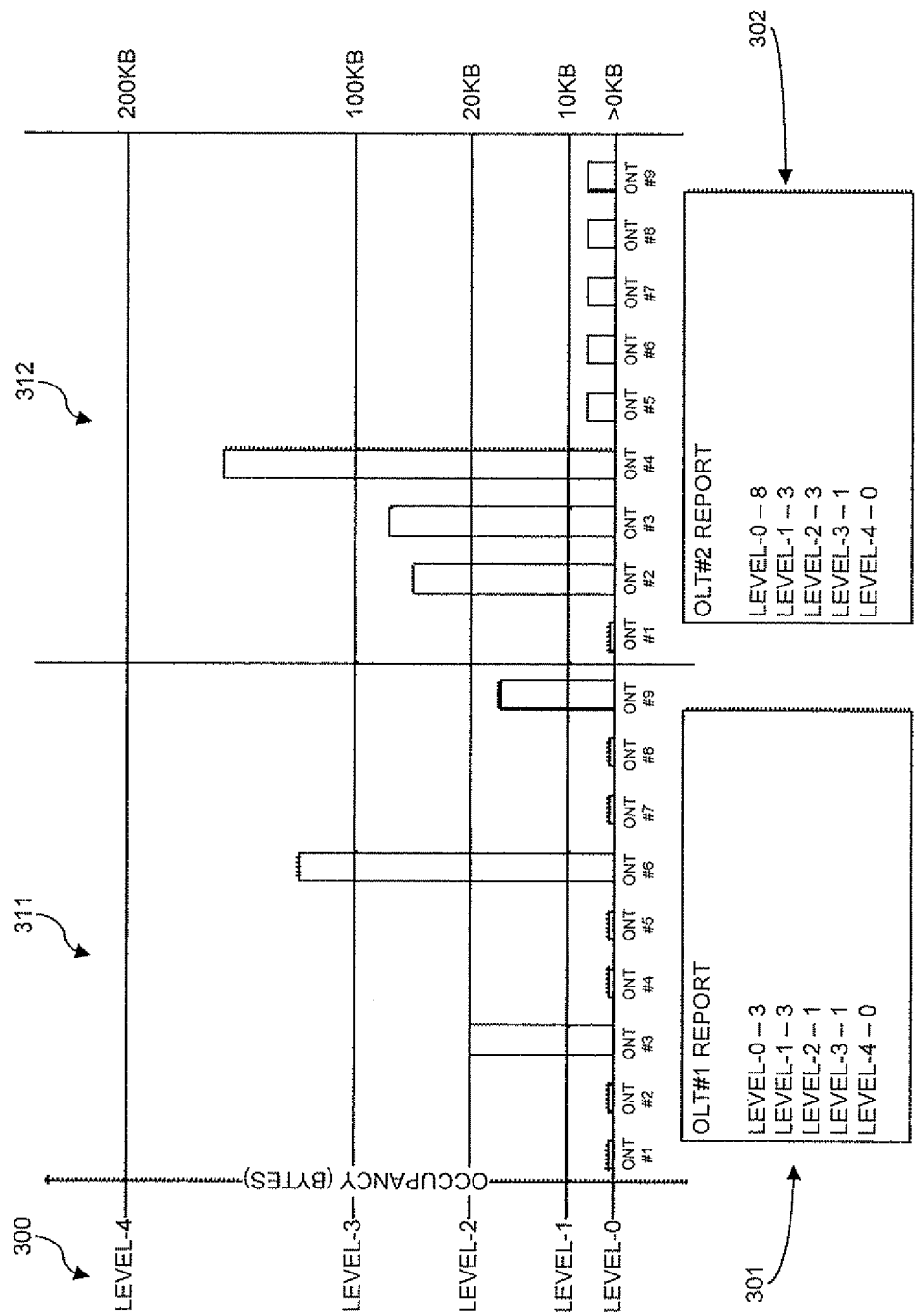
FIG. 3, a plot of occupancy levels.

Referring to FIG. 3, a plot of occupancy levels, a broadcast occupancy report (BOR) is based on a "water-level" concept, theoretically analogues with water filling a bucket. Multiple (N) levels are predefined that correspond to N levels of occupancy in the ONT queue. Each of the N levels of occupancy indicates a number of bytes waiting to be transmitted. Each predefined level of occupancy represents multiple bytes, typically several orders of magnitude above the byte level, for example, 10 Kbytes (KB) or 100 KB. In particular, each level of occupancy indicates at least that many bytes are waiting to be transmitted by an ONT. Level-0 represents any non-zero occupancy. Levels 1, 2, . . . , N are defined to represent increasing levels of occupancy. The broadcast occupancy report generation process 204 counts, per each predefined level, the number of associated ONTs that have occupancy equal or above the pre-defined level. The resulting BOR includes N integer numbers representing the number of ONTs that have occupancy equal or above each of the respective pre-defined levels. In other words, each of the broadcast occupancy reports is based on pre-defined levels of occupancy, each of the levels of occupancy indicative of an amount of data waiting to be sent from an ONT. Each pre-defined level of occupancy, except for a topmost pre-defined level of occupancy, reports a total number of controlled ONTs having occupancy above each pre-defined level of occupancy, and at most equal to a next pre-defined level of occupancy.

The amount of data indicated by an occupancy level is typically not an exact amount, but indicative of an amount of data that is significant for a particular system. Each of the predefined levels of occupancy reports a total number of ONTs associated with the respective occupancy (for example, an amount of data waiting to be sent equal or above a pre-defined level). The total number of ONTs being associated with the OLT port controller from which each of the broadcast occupancy reports is transmitted. In other words, each of the predefined levels of occupancy reports a total number of ONTs having occupancy above a first predefined level of occupancy and less-than or equal to a second predefined level of occupancy. This provides a water-level report from each OLT port controller.

FIG. 3 shows a non-limiting example of occupancy levels 300 and BORs (301, 302) for two OLT port controllers, shown as OLT#1 311 and OLT#2 312, respectively. Each OLT port controller is connected to nine ONTs. Each ONT's occupancy is represented by a vertical bar. For the purpose of the example, 4 occupancy levels 300 have been defined (N=4) at 10 Kbyes (KB), 20 KB, 100 KB and 200 KB.

In the case of OLT#1 311, 6 ONTs have no traffic waiting (ONT#1, 2, 4, 5, 7, and 8) and are therefore not counted. 3 ONTs (ONT#3, 6, and 9) have non-zero occupancy and therefore level-0 report is 3 (as shown in BOR 301 "LEVEL-0-3"). The same 3 ONTs (ONT#3, 6, and 9) have occupancy higher than level-1 (higher than 10 KB) and are therefore included in the level-1 count (as shown in BOR 301 "LEVEL-1-3"). 1 ONT (ONT#6) has an occupancy higher than level-2 (higher than 20 KB) and is therefore included in the level-2 count (as shown in BOR 301 "LEVEL-2-1"). The same 1 ONT (ONT#6) has an occupancy higher than level-3 (higher than 100 KB) and is therefore included in the level-3 count (as shown in BOR 301 "LEVEL-3-1"). No ONTs have an occupancy higher than level-4 (higher than 200 KB) and therefore the level-4 count is zero (as shown in BOR 301 "LEVEL-4-0").

A similar report generation process on OLT#2 312, produces corresponding BOR 302, as well as similar processes on other participating OLT port controllers producing respective BORs.

Specific occupancy levels, including but not limited to, the number of occupancy levels and the number of bytes indicated by each level, can be chosen depending on the specific application and PON system. Based on this description, one skilled in the art will be able to define occupancy levels for a specific application and/or aggregation system. While occupancy levels can be pre-defined for a PON system, in certain circumstances changing the occupancy levels may be desired or necessary.

Each OLT port controller broadcasts a corresponding BOR. Using the example of FIG. 2, each OLT port controller broadcasts a generated BOR using an Ethernet channel. A preferred technique is to encapsulate BORs as broadcast Ethernet frames over a dedicated virtual local area network (VLAN) channel used by all OLTs to transmit and receive the reports. In this case, the BOR frames will be replicated by the Ethernet switch and transmitted to all receiving OLTs. Note, multicast Ethernet frames can also be used in a similar manner as broadcast frames. In a case where there are any system limitations that prevent using broadcast or multicast frames, unicast Ethernet frames can be used, in which case a dedicated BOR frame will have to be sent to each OLT controller.

Each OLT port controller receives and aggregates the BORs from all other OLT port controllers in the PON system. Each OLT port controller uses the received BORs to calculate bandwidth allocation for each OLT port controller to use. The bandwidth allocation process 206 (FIG. 2) preferably implements a fair bandwidth assignment policy. The bandwidth allocation process 206 uses the "water-level" BORs received from the BOR generation process 204 on participating OLT port controllers. The bandwidth allocation process 206 divides the total available bandwidth in the system between the OLT port controllers according to the number of ONTs at each occupancy level for each OLT port controller. The bandwidth allocation process 206 can be implemented as a recursive process. The bandwidth allocation process 206 starts from level-0 and allocates the available bandwidth fairly between the OLT port controllers. Allocating bandwidth includes dividing the available bandwidth of the SNI uplink channel among OLT port controllers so that users and/or applications associated with the OLT port controller, and specifically with the ONTs associated with the OLT port controller are provided with bandwidth that each ONT (user and/or application) requires at the time of bandwidth allocation. If there is excess bandwidth remaining after fully serving level-0, bandwidth allocation process 206 continues and allocates bandwidth for level-1. Level-0, level-1, . . . , level-N refer to the pre-defined levels that correspond to N levels of occupancy in the ONT queue. If there is excess bandwidth remaining after fully serving level-1, bandwidth allocation process 206 goes on to allocating bandwidth for level-2. This allocation continues for higher occupancy levels until all bandwidth has been allocated. Within each occupancy level, the allocation is based on a simple fairness rule—ONTs have equal weight, and each reported ONT will receive an equal bandwidth allocation.

Referring to FIG. 4, a table showing the calculation for a non-limiting example of a bandwidth allocation process, the available bandwidth is 200 KB. The bandwidth is typically represented by a number of bytes transmitted per time slot. So, for example, if the time slot is 10 milliseconds (ms), 200 KB will translate to an average throughput of 20,000 KB/sec). The total available system bandwidth (per time slot) can be statically configured, or dynamically updated depending on the real-time assured bandwidth utilization in the system. Using the example BORs described in reference to FIG. 3, the table of FIG. 4 illustrates how OLT#1 311 will calculate the share of the available bandwidth for OLT#1.

On line 400, the total bandwidth available for level-0 is 200 KB. On line 402, the level-0 total system report is calculated. OLT#1 311 reports 3 ONTs at level-0 (needing 10 KB of bandwidth or more to transmit data), and OLT#2 reports 8 ONTs at level-0 (needing 10 KB of bandwidth or more to transmit data), for a total of (3+8)*10 KB=110 KB of level-0 waiting to be transmitted. 110 KB is less than the total bandwidth available (200 KB), so the level-0 system grant is 110 KB, which is a grant of 100% of the requested level-0 bandwidth. On line 404, the level-0 local report indicates that OLT#1 has a level-0 occupancy of 3, each indicating 10 KB to send, for a level-0 local report of 30 KB, 100% of which can be used for a level-0 local grant of 30 KB (100%).

On line 406 the total bandwidth available for level-1 is the total bandwidth available for level-0 (200 KB) minus the system grant for level-0 (110 KB): 200 KB-110 KB=90 KB. On line 408, the level-1 total system report is calculated. OLT#1 reports 3 ONTs at level-1 (needing 20 KB of bandwidth or more to transmit data, which in this case is 20 KB level-1 minus 10 KB level-0, which indicates needing an additional 10 KB bandwidth in addition to the level-0 allocation), and OLT#2 reports 3 ONTs at level-1, for a total of (3+3)*(20 KB−10 KB)=60 KB level-1 total system report of level-1 waiting to be transmitted. Note that the required bandwidth for a given level depends on the difference between the given level and the previous level. In this case, the required bandwidth for level-1 depends on the difference between level-1 (which indicates 20 KB) and level-0 (which indicates 10 KB). The level-1 total system report of 60 KB is less than the total bandwidth available for level-1 (90 KB), so the level-1 system grant is 60 KB, which is a grant of 100% of the requested level-1 bandwidth. On line 410, the level-1 local report indicates that OLT#1 has a level-1 occupancy of 3, each requiring an additional (additional to level-0 grant) of (20 KB−10 KB=) 10 KB to send, for a total level-1 local report of 30 KB, 100% of which can be used for a level-1 local grant of 30 KB (100%).

On line 412 the total bandwidth available for level-2 is the total bandwidth available for level-1 (90 KB) minus the system grant for level-1 (60 KB): 90 KB-60 KB=30 KB. On line 414, the level-2 total system report is calculated. OLT#1 reports 1 ONTs at level-2 (needing 100 KB of bandwidth or more to transmit data), and OLT#2 reports 3 ONTs at level-2, for a total of (1+3)*(100 KB-20 KB)=320 KB level-2 total system report of level-2 waiting to be transmitted. The level-2 total system report of 320 KB is more than the total bandwidth available for level-2 (30 KB), so the level-2 system grant is 30 KB, which is a grant of 9.375% of the requested level-2 bandwidth. On line 416, the level-2 local report indicates that OLT#1 has a level-2 occupancy of 1, requiring an additional (additional to level-1 grant) of (100 KB-20 KB=) 80 KB to send, for a total level-2 local report of 80 KB, 9.375% of which can be used for a level-2 local grant of (80 KB*9.375%=) 7.5 KB.

On line 418 the total bandwidth available for level-3 is the total bandwidth available for level-2 (30 KB) minus the system grant for level-2 (30 KB): 30 KB−30 KB=0 KB (zero KB), and no bandwidth remains for serving level-3.

In the current example, OLT#1 will receive 67.5 KB (line 420) out of the 200 KB. OLT#2 will perform a similar calculation (not shown) which will result in allocation of 132.5 KB. Assuming each OLT will then divide fairly the local grant of bandwidth between associated ONTs, the BOR and water-level method of the current embodiment provides system level fairness at the resolution of an ONT (user/subscriber).

The BOR and water-level method of the current embodiment is scalable. The complexity of the method, in other words the allocation algorithm, is independent of the number of ONTs. Because bandwidth allocation decisions need to be made dynamically, in real-time, and with limited processing resources, a scalable solution has increased value for providers and customers.

Figure 5:
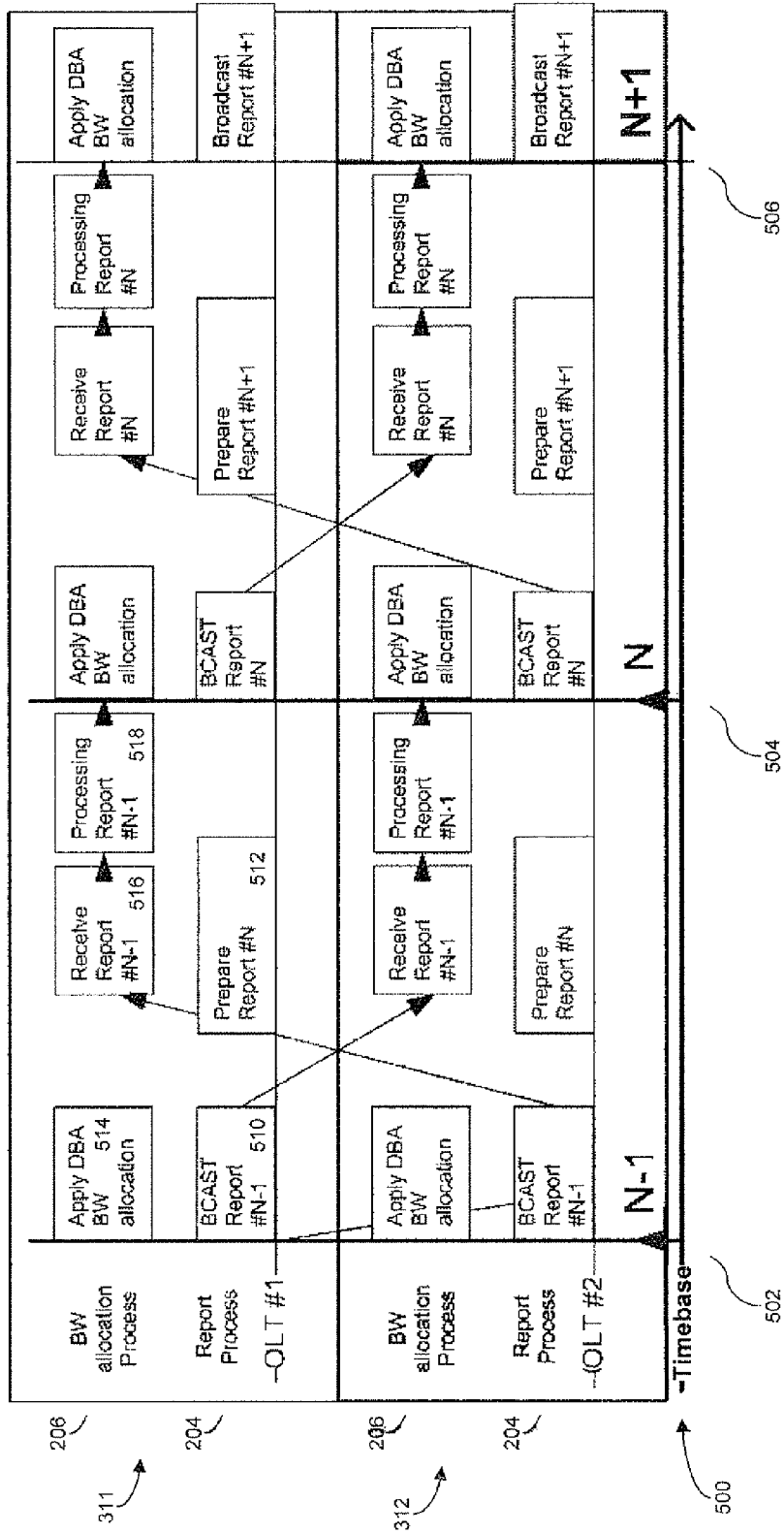
FIG. 5 is a diagram of BOR generation process (also referred to as the reporting process) and bandwidth allocation process working synchronously.

Referring to FIG. 5, a diagram of BOR generation process (also referred to as the reporting process) and bandwidth allocation process working synchronously, a preferred implementation includes synchronization of the participating OLT port controllers. In particular, the OLT port controllers should apply bandwidth allocation decisions at the same time. As a central controller is not required in the current embodiment, a preferred implementation is for all participating OLT port controllers to use a common time base for synchronization. In a preferred implementation, BORs are generated periodically and at the same time by all OLT port controllers. BORs are received periodically and at substantially the same time. BORs should typically be generated at a rate sufficient to facilitate real-time dynamic bandwidth allocation between a plurality of OLT port controllers.

In FIG. 5, time 500 starts on the left side of the diagram, with newer time extending to the right. Times N−1 (502), N (504), and N+1 (506), are shown. An OLT broadcast occupancy report generation process 204 and an OLT bandwidth allocation process 206 are running on each of OLT#1 311 and OLT#2 312. In the context of this document, each period from one timebase to the next (such from time N−1 (502) to time N (504)) is also referred to as a cycle. When a time base signal, for example at time N−1 (502), is received by the OLT port controllers, each OLT port controller performs the following tasks:

Reporting process—broadcasts the BOR (one of which is shown as 510, which was prepared in the previous cycle), and starts preparing 512 the next report.

Bandwidth allocation process—applies 514 the bandwidth allocation decision that was prepared in the previous cycle. Then receives 516 the bandwidth reports from the other OLTs, and prepares 518 bandwidth allocation for the next cycle.

At each cycle (each timebase), the bandwidth allocated by an OLT port controller to each of the associated ONTs can be adjusted, thereby providing dynamic bandwidth allocation between the plurality of OLT port controllers. In a preferred implementation, BORs are generated, transmitted, received, and bandwidth is allocated at a rate corresponding to the changing needs of users of the PON system, thereby providing real-time dynamic bandwidth allocation between the plurality of OLT port controllers.

Regarding BOR generation frequency (or bandwidth allocation cycle time), consider that upstream traffic is buffered in the ONT and waiting for bandwidth allocation from the OLT. A design goal for bandwidth allocation cycle time would be that the BOR generation frequency (cycle) will be short enough, so that ONTs will receive service (bandwidth allocation) before the ONT upstream queues fill up (which may result in traffic discard). A system designer should calculate, based on the specific implementation parameters (mainly—the upstream buffer size of the ONT, and the data rates expected in the upstream) what should be an optimal BOR cycle to maintain the design target. Even if the optimal BOR cycle time cannot be reached (due to, for example, processing resources limitations at the OLT), a good bandwidth allocation should implement short enough BOR cycles to maintain users' quality of experience. Based on typical systems deployed today, the likely BOR generation frequency (bandwidth allocation cycle time) would be between 10 ms and 100 ms.

Given the implementation realities of a typical PON system, the case of a participating OLT port controller not receiving a BOR is unlikely. However, good engineering practice will consider this case. If an OLT port controller does not receive a BOR during a particular time one option is for the OLT port controller to simply not transmit any data during the particular time. Other options include the OLT port controller to using the previously received BORs, or using the previous local grants. The specific action for an OLT port controller to take, or not to take will depend on the specific PON system. Based on this description, one skilled in the art will be able to design and implement appropriate measures for system components to take to handle various operational scenarios.

As previously noted, the above description is for a ease where all the managed traffic has equal priority. A feature of the current embodiment is that the BOR mechanism can be used for providing fairness at the ONT level. In many cases, traffic coming from ONTs may be classified into multiple priority levels. The above-described BOR and bandwidth allocation mechanism can be used in the case of multiple priorities traffic.

One implementation for maintaining fairness in bandwidth allocation for multiple priority traffic from ONTs to an aggregation point includes the use of a separate BOR report per priority level. The bandwidth allocation process will then start by assigning system bandwidth for the high priority traffic based on the high priority BORs received (using the same bandwidth allocation method described above). After assigning bandwidth for the highest priority traffic, the remaining bandwidth is assigned to lower priority traffic. The remaining bandwidth can initially be assigned to traffic having the second highest (next lower) priority, and the method can be repeated, assigning any remaining bandwidth to the next lower (third highest) priority. The process is similarly repeated until all bandwidth has been assigned, or until all traffic has been assigned bandwidth. This implementation effectively creates a strict priority-like bandwidth allocation policy, where higher priority traffic is always served before lower priority.

Using a method similar to the strict priority-like bandwidth allocation policy, more complex scheduling decisions can be implemented including, but not limited to, weighted fair allocation. An example of implementation for weighted-fair bandwidth allocation is to allocate a relative portion of the total system available bandwidth to each priority level. Based on the above description, one skilled in the art will be able to implement a bandwidth allocation mechanism for multiple priorities traffic.

The above-described method for peer-to-peer (distributed) dynamic bandwidth allocation can alternatively be implemented using a centralized architecture. In an alternative implementation, BORs are received by a central controller. In this case, the central controller runs the bandwidth allocation process and calculates a respective share of SNI bandwidth to be assigned to each OLT port controller. The calculated respective share of SNI bandwidth is communicated from the central controller to each respective OLT port controller. Note that in this case the term "respective share of SNI bandwidth" refers to an indicator of how much bandwidth each OLT port controller should use, and should not be confused with reallocation or transfer of bandwidth being used by the central controller to (an) OLT port controller(s). Each OLT port controller then uses the received calculated share of bandwidth to grant bandwidth to associated ONTs. Based on the above description, one skilled in the art will be able to implement broadcast occupancy report generation and allocation processes on a variety of architectures as appropriate for a specific system.

Referring again to FIG. 2, a system for dynamic bandwidth allocation in a passive optical network (PON) communications system includes a plurality of optical networking terminals (ONTs) and a plurality of optical line terminal (OLT)

port controllers. Data in the PON communications system is aggregated towards a service network interface (SNI). Each OLT port controller controls at least one of the ONTs. Each OLT port controller is configured for transmitting a broadcast occupancy report (BOR) to the plurality of OLT port controllers and configured for dynamically assigning bandwidth to each of the controlled ONTs based on the received BORs.

Preferably, each OLT port controller is configured to generate the BORs periodically and at substantially the same time, while also receiving the BORs periodically and at substantially the same time. Each OLT port controller can be configured to generate the BORs at a rate sufficient to facilitate real-time dynamic bandwidth allocation between the plurality of OLT port controllers. The broadcast occupancy reports can be transmitted via an Ethernet switch preferably using broadcast or multicast Ethernet frames, or alternatively using unicast.

The present embodiment defines a protocol that enables all OLT PON ports (or more specifically, the devices implementing the OLT PON ports, OLT port controllers) in a PON system to communicate real time traffic load information between each other. By utilizing the present protocol, each PON port has a system-wide and real-time view of the traffic load in all other PON ports. Based on the received traffic load information, and preconfigured service level parameters, each PON port dynamically self-regulates respective upstream throughput. In this way, the available SNI bandwidth at an aggregation point is dynamically assigned to the PON ports.

The method of the present protocol facilitates an average upstream throughput that does not exceed the maximum SNI bandwidth. Thus, congestion is avoided at the aggregation point. SNI bandwidth is effectively utilized, and dynamically allocated, to the PON ports according to real time network traffic loads. Fairness and other service level parameters can be configured per system level, in contrast to conventional solutions that may be limited to configuration per OLT port.

In contrast to conventional solutions, the present protocol can be implemented without using a centralized controller. The present protocol can be described as essentially a peer-to-peer approach where all PON devices are peers and each PON device implements respective bandwidth allocation policy. The present peer-to-peer protocol can be implemented using only unidirectional reporting—decisions are made locally, which reduces decision latency. Broadcast Ethernet frames can be used for the reporting—this means each report has to be generated only once. Because of the relatively lower computational requirements of the present protocol, as compared to conventional solutions, the present protocol can be implemented using currently available hardware in existing PON systems. Typical processors in existing PON systems do not have enough processing capacity to handle real time dynamic bandwidth allocation tasks. Implementation of the present protocol does not require additional processors or significant resources of existing processors. When using an implementation such as sending broadcast occupancy reports via Ethernet frames, an in-band channel can be used—there is no need for a dedicated control link.

Note that a variety of implementations for modules and processing are possible, depending on the application. Modules are preferably implemented in software, but can also be implemented in hardware and firmware, on a single processor or distributed processors, at one or more locations. The above-described module functions can be combined and implemented as fewer modules or separated into sub-functions and implemented as a larger number of modules. Based on the above description, one skilled in the art will be able to design an implementation for a specific application.

It should be noted that the above-described examples, numbers used, and exemplary calculations are to assist in the description of this embodiment. Inadvertent typographical and mathematical errors should not detract from the utility and basic advantages of the invention.

It will be appreciated that the above descriptions are intended only to serve as examples, and that many other embodiments are possible within the scope of the present invention as defined in the appended claims.

What is claimed is:

1. A method of dynamic bandwidth allocation in a passive optical network (PON) communications system, the PON communications system including a plurality of optical line terminal (OLT) port controllers, wherein each OLT port controller controls at least one respective optical networking terminal (ONT), and wherein data is forwarded by the OLT port controllers towards a common service network interface (SNI), the method comprising the steps of:
   (a) generating by each of the plurality of OLT port controllers a respective broadcast occupancy report (BOR);
   (b) transmitting from each of the plurality of OLT port controllers the respective BORs to the plurality of OLT port controllers;
   (c) receiving the respective BORs at each of the plurality of OLT port controllers; and
   (d) dynamically assigning bandwidth at each of the plurality of OLT port controllers to each of the controlled ONTs for transmission from each of the controlled ONTs toward the common SNI, the assigned bandwidth based on the respective BORs that the OLT port controllers receive, the assigned bandwidth dynamically controlling aggregated bandwidth toward the common SNI.

2. The method of claim 1 wherein said BOR includes pre-defined levels of occupancy, each of said pre-defined levels of occupancy indicative of an amount of data waiting to be sent from an ONT, each of said pre-defined levels of occupancy reporting a total number of ONTs that are controlled by the OLT port controller that generates the BOR and that have at least said amount of data waiting to be sent.

3. The method of claim 2 wherein each of said pre-defined levels of occupancy except for a topmost pre-defined level of occupancy reports a total number of controlled ONTs having occupancy above said each pre-defined level of occupancy and at most equal to a next pre-defined level of occupancy.

4. The method of claim 1 wherein the BORs are generated periodically and at substantially the same time.

5. The method of claim 1 wherein the BORs are received periodically and at substantially the same time.

6. The method of claim 1 wherein the BORs are generated at a rate sufficient to facilitate real-time dynamic bandwidth allocation between said plurality of OLT port controllers.

7. The method of claim 1 wherein the BORs are transmitted via Ethernet using a method selected from the group consisting of: broadcast, multicast, and unicast communications.

8. The method of claim 1 wherein the BORs are transmitted from every said OLT port controller to every other said OLT port controller via an Ethernet switch using broadcast Ethernet frames.

9. The method of claim 1 wherein a plurality of BORs are generated, each of said plurality of BORs corresponding to a priority level of the data, and dynamically assigning bandwidth based on said plurality of BORs.

10. A system for dynamic bandwidth allocation in a passive optical network (PON) communications system wherein data is forwarded towards a service network interface (SNI), the system comprising:
(a) a plurality of optical networking terminals (ONTs); and
(b) a plurality of optical line terminal (OLT) port controllers, each OLT port controller configured for:
controlling at least one respective ONT of said plurality of ONTs;
(ii) generating a respective broadcast occupancy report (BOR);
(iii) transmitting the respective BOR to the plurality of OLT port controllers;
(iv) receiving the respective BORs; and
(v) dynamically assigning bandwidth to each of the controlled ONTs for transmission from each of the controlled ONTs toward the common SNI, the assigned bandwidth based on the received respective BORs, the assigned bandwidth dynamically controlling aggregated bandwidth toward the common SNI.

11. The system of claim 10 wherein said BOR includes pre-defined levels of occupancy, each of said pre-defined levels of occupancy indicative of an amount of data waiting to be sent from an ONT, each of said pre-defined levels of occupancy reporting a total number of ONTs that are controlled by the OLT port controller that generates the BOR and that have at least said amount of data waiting to be sent.

12. The system of claim 11 wherein each of said pre-defined levels of occupancy except for a topmost pre-defined level of occupancy reports a total number of controlled ONTs having occupancy above said each pre-defined level of occupancy and at most equal to a next pre-defined level of occupancy.

13. The system of claim 10 wherein each OLT port controller is configured to generate the BORs periodically and at substantially the same time.

14. The system of claim 10 wherein each OLT port controller receives the BORs periodically and at substantially the same time.

15. The system of claim 10 wherein each OLT port controller is configured to generate the BORs at a rate sufficient to facilitate real-time dynamic bandwidth allocation between said plurality of OLT port controllers.

16. The system of claim 10 wherein the broadcast occupancy reports are transmitted via Ethernet using a method selected from the group consisting of: broadcast, multicast, and unicast communications.

17. The system of claim 10 wherein the broadcast occupancy reports are transmitted from every said OLT port controller to every other said OLT port controller via an Ethernet switch using broadcast Ethernet frames.

18. The system of claim 10 wherein a plurality of BORs are generated, each of said plurality of BORs corresponding to a priority level of the data, and dynamically assigning bandwidth based on said plurality of BORs.

19. A method of dynamic bandwidth allocation in a passive optical network (PON) communications system, the PON communications system including a plurality of optical line terminal (OLT) port controllers, wherein each OLT port controller controls at least one respective optical networking terminal (ONT), wherein data is forwarded by the OLT port controllers towards a service network interface (SNI), and including a central controller, the method comprising the steps of:
(a) generating by each of the plurality of OLT port controllers a respective broadcast occupancy report (BOR);
(b) transmitting from each of the plurality of OLT port controllers the respective BORs to the central controller;
(c) receiving the respective BORs at the central controller, calculating, at the central controller a respective share of SNI bandwidth for each OLT port controller based on the received respective BORs, and transmitting said respective share of SNI bandwidth to each respective OLT port controller;
(d) receiving said respective share of SNI bandwidth at each of the plurality of OLT port controllers; and
(e) dynamically assigning bandwidth at each of the plurality of OLT port controllers to each of the controlled ONTs for transmission from each of the controlled ONTs toward the common SNI, the assigned bandwidth based on the received respective share of SNI bandwidth, the assigned bandwidth dynamically controlling aggregated bandwidth toward the common SNI.

20. The method of claim 19 wherein said BOR includes pre-defined levels of occupancy, each of said pre-defined levels of occupancy indicative of an amount of data waiting to be sent from an ONT, each of said pre-defined levels of occupancy reporting a total number of ONTs that are controlled by the OLT port controller that generates the BOR and that have at least said amount of data waiting to be sent, wherein each of said pre-defined levels of occupancy except for a topmost pre-defined level of occupancy reports a total number of controlled ONTs having occupancy above said each pre-defined level of occupancy and at most equal to a next pre-defined level of occupancy.

21. A system for dynamic bandwidth allocation in a passive optical network (PON) communications system, the system comprising:
(a) a plurality of optical line terminal (OLT) port controllers, wherein each OLT port controller is configured for:
(i) controlling at least one respective optical networking terminal (ONT), wherein data is forwarded by the OLT port controllers towards a service network interface (SNI);
(ii) generating a respective broadcast occupancy report (BOR); and
(iii) transmitting the respective BORs; and
(b) a central controller, configured for:
(i) receiving the respective BORs;
(ii) calculating a respective share of SNI bandwidth for each OLT port controller based on the received respective BORs; and
(iii) transmitting said respective share of SNI bandwidth to each respective OLT port controller; and
wherein each OLT port controller receives said respective share of SNI bandwidth and dynamically assigns bandwidth to each of the controlled ONTs based on the received respective share of SNI bandwidth.

22. The system of claim 21 wherein said BOR includes pre-defined levels of occupancy, each of said pre-defined levels of occupancy indicative of an amount of data waiting to be sent from an ONT, each of said pre-defined levels of occupancy reporting a total number of ONTs that are controlled by the OLT port controller that generates the BOR and that have at least said amount of data waiting to be sent, wherein each of said pre-defined levels of occupancy except for a topmost pre-defined level of occupancy reports a total number of controlled ONTs having occupancy above said each pre-defined level of occupancy and at most equal to a next pre-defined level of occupancy.

* * * * *